United States Patent [19]

Matsuo et al.

[11] Patent Number: 5,716,447
[45] Date of Patent: Feb. 10, 1998

[54] FLOWABILITY ADDITIVE

[75] Inventors: Shigemi Matsuo; Akira Ohta, both of Chigasaki; Tadashi Tsuchitani, Yokohama; Minoru Ueda, Fujisawa, all of Japan

[73] Assignee: MBT Holding AG, Zurich, Switzerland

[21] Appl. No.: 905,284

[22] Filed: Aug. 1, 1997

Related U.S. Application Data

[63] Continuation of Ser. No. 590,314, Jan. 23, 1996, abandoned.

[30] Foreign Application Priority Data

Jan. 23, 1995 [JP] Japan ................................ 7-041156

[51] Int. Cl.$^6$ .................................................. C04B 24/02
[52] U.S. Cl. ........................ 106/802; 106/724; 106/725; 106/804; 106/808; 106/809; 106/823
[58] Field of Search ............................. 106/724, 725, 106/802, 804, 808, 809, 823

[56] References Cited

U.S. PATENT DOCUMENTS

| | | | |
|---|---|---|---|
| 3,663,251 | 5/1972 | Moren et al. | 106/823 |
| 5,154,771 | 10/1992 | Wada et al. | 106/823 |
| 5,174,821 | 12/1992 | Matsuoka et al. | 106/823 |
| 5,180,430 | 1/1993 | Gartner et al. | 106/823 |
| 5,340,385 | 8/1994 | Arfaei et al. | 106/823 |
| 5,348,583 | 9/1994 | Arfaei et al. | 106/823 |
| 5,376,173 | 12/1994 | Haze et al. | 106/802 |
| 5,429,675 | 7/1995 | Cheung et al. | 106/823 |

FOREIGN PATENT DOCUMENTS

| | | | |
|---|---|---|---|
| 2120542 | 8/1972 | France. | |
| 1935507 | 1/1970 | Germany | 106/802 |
| 3317817 | 11/1984 | Germany | 106/802 |
| 57-100955 | 6/1982 | Japan | 106/802 |
| 59-156946 | 9/1984 | Japan | 106/802 |
| 722873 | 3/1980 | U.S.S.R. | 106/802 |
| 1363530 | 8/1974 | United Kingdom. | |
| WO 91/17127 | 11/1991 | WIPO. | |

OTHER PUBLICATIONS

Chemical Abstract No. 115:14256t, abstract of Japanese Patent Specification No. 2302353 (Dec. 1990).
Chemical Abstract No. 114:170113a, abstract of Japanese Patent Specification No. 2307851 (Dec. 1990).
Copy of FR Search Report for FR Application No. 9600515 dated 2 Apr. 1997.
Copy GB Search Report for Gb Application No. 9601125.9 dated 11 Apr. 1997.

*Primary Examiner*—Anthony Green
*Attorney, Agent, or Firm*—Carol A. Loeschorn; Andrew N. Parfomak

[57] ABSTRACT

A cement pumpability-enhancing additive which comprises polyethylene glycol and diethylene glycol monobutyl ether and/or a derivative thereof, and optionally polysaccharide. The additive is especially useful for high-strength, high-flow concretes for use in construction.

9 Claims, No Drawings

FLOWABILITY ADDITIVE

This is a continuation of application Ser. No. 08/590,314, filed 23 Jan. 1996, now abandoned.

The present invention relates to a cement additive which is intended to improve the workability of cement compositions for pump application.

Pump application is a way of conveying cement compositions such as cement paste, mortar, and concrete to a desired place by means of a pump. In the building of modern large-scale concrete structures, efficient conveyance of large quantities of concrete is achieved by employing a high-capacity pump and a large-diameter pipe or branched pipes, the latter permitting concrete to be cast over a large area at one time. While this method is acceptable for conventional concrete, it is not acceptable for the high strength, high-flow concrete used in high-rise concrete buildings in urban areas, and which concrete exhibits special properties such as high strength and self-filling. If it is attempted to pump such concrete by the method hereinabove described, it will lose flowability during its conveyance, the degree of loss depending on mix proportions, environment and on-site conditions. The carrying out of the process and the quality of the final concrete are thereby compromised.

Several means have been proposed to address this problem, involving increasing the amount of powder or free aggregate in a concrete mix, decreasing the amount of mixing water, or adding a thickening agent. These means, however, have the disadvantage of increasing the concrete viscosity, raising the pumping pressure, and reducing the durability of the cured concrete (because of the presence of a higher proportion of powder). Such disadvantages sometimes hinder site execution and quality control, and hence the abovementioned means are not a satisfactory solution at the present time.

The use of pumpability admixtures has been suggested, one such admixture containing as essential ingredients polyethylene glycol and polycarboxylic acid-based dispersing agent. Unfortunately, this dispersing agent increases the concrete viscosity or cannot prevent the decrease of flowability completely after pumping.

There is therefore a demand for cement additive which permits smooth pump application of concrete, while ensuring good flowability and pumpability, without causing increase in viscosity.

It has now been found that it is possible to provide good pumpability and flowability for such concretes while retaining their good properties. The invention therefore provides a cement pumpability-enhancing additive which comprises polyethylene glycol and diethylene glycol monobutyl ether and/or a derivative thereof, and optionally a polysaccharide.

Diethylene glycol monobutylether (hereinafter "DGME") is a well-known material and is commercially available, for example, as butyl "Carbitol" (trade mark). The derivative used in the present invention is preferably an adduct of DGME with 1–2 mol of propylene oxide. It is preferred to have present at least some DGME, and the preferred material is a mixture of DGME and the abovementioned adduct.

The polyethylene glycol used in the present invention is preferably one which has an average molecular weight (weight-average) of from 4,000 to 150,000.

The polysaccharide, if used in the present invention, is preferably one or more selected from curdlan, sugar alcohol and xanthan gum.

The cement additive according to the present invention should preferably be used in combination with a cement dispersing agent. This may be selected from any of the commercial-available cement dispersing agents, such as a polycarboxylic acid, aminosulfonic acid, a napthalenesulfonic acid-formalin condensate, a melaminesulfonic acid-formalin condensate, ligninsulfonic acid, and a hydroxycarboxylic acid, and metal salts thereof (including alkali metal salts and alkaline earth metal salts).

The abovementioned DGME/DGME derivative, polyethylene glycol, polysaccharide and dispersing agent should be used as a single component as a general rule; however, they may also be used as two or more components.

The cement pumpability-enhancing additive according to the present invention may be used in combination with other additives, such as air-entraining agents, drying shrinkage reducing agents, high-early strengthening agents, setting accelerators, setting retarders, defoaming agents, rust inhibitors, accelerating agents, and thickening agents.

The cement pumpability-enhancing additive according to the present invention should be used in an amount adequate to achieve good pumpability with retention of properties. This will vary depending on the cement composition to which it is added. Usually the amount ranges from 0.1 to 5.0 wt % (in terms of solids in the cement additive) for the amount of cement contained in the cement composition. It is not specifically limited so long as there is enough to impart desired flowability and pumpability to the cement composition for pump application.

Cementitious compositions to which the additives of this invention have been added exhibit a combination of good pumpability and good viscosity. The compositions flow well and are easy to apply. In an especially valuable embodiment of the invention, the high-strength, high-flow concretes used nowadays for construction, which have not been easy to pump using conventional technology, can be made readily pumpable with little or no loss of properties by means of this invention. The invention therefore also provides a method for applying a cementitious composition by pumping, wherein there is first added to the composition a pumpability-enhancing additive as hereinabove described, and the cementitious composition is then pumped. The invention further provides a pumpable cementitious composition comprising a cementitious composition and a pumpability-enancing additive as hereinabove described.

The present invention will now be further explained with reference to the following non-limiting examples which demonstrate the application of the cement additive to mortar and concrete. In the tables "Cx %" is shorthand for percentage by weight based on the weight of cement.

EXAMPLES (1) Mortar and concrete—their mix proportion, preparation, and materials (1-1) Mortar Mortar samples are prepared according to the mix proportion shown in Table 1, and their properties are tested.

TABLE 1

| Water/cement ratio (%) | Sand/cement ratio | weight per unit volume (kg/m$^3$) | | |
|---|---|---|---|---|
| | | water | cement | fine aggregate |
| 30.0 | 1.30 | 265 | 883 | 1146 |

To make the mortar sample, each material is measured so that the volume of the resulting mix is 30 liters. All of the measured materials are placed into a pan-type forced-action mixer (with a nominal capacity of 50 liters), and mixing is performed for 120 seconds. The mix proportion shown in Table 1 is established, based on the mix proportion of high-flow concrete (with the weight of cement per unit volume being about 550 kg/m$^3$) which exhitits a slump flow of 60±5 cm. The amount of air in the mortar is 1.5±0.5 vol. %.

(1-2) Concrete

Concrete samples are prepared according to the mix proportion shown in Table 2, and their properties are tested.

TABLE 2

| Ratio of | | Weight per unit volume (kg/m$^3$) | | | |
|---|---|---|---|---|---|
| Water/cement ratio (%) | fine aggregate (%) | water | cement | fine aggregate | coarse aggregate |
| 30.0 | 44.8 | 170 | 567 | 737 | 922 |

To make the concrete sample, each material is measured so that the volume of the resulting mix is 4 m$^3$. All of the measured materials are placed into a forced-action twinshaft mixer (with a capacity of 4 m$^3$), and mixing is performed for 60 seconds. The slump, slump flow and air content of the sample measured immediately after mixing are 25.0 cm, 59.0–60.0 cm, and 1.5–1.6%, respectively.

(1-3) Specifications of Materials (a) Fine aggregate: Sand from Oigawa River (specific gravity=2.60, fineness modulus=2.76)

(b) Coarse aggregate: Crushed hard sanstone (specific gravity=2.65, maximum particle size=20 mm)

(c) Cement: Normal Portland cement from Chichibu Onoda Co., Ltd. (specific gravity=3.16)

(d) DGME derivative:
   DGME (butyl "Carbitol" is used)
   Adduct of DGME with 1 mol of propylene glycol (BP1 for short)
   Adduct of DGME with 2 mol of propylene glycol (BP2 for short)

(f) Polyethylene glycol:
   Polyethylene glycol (molecular weight=4000, PC-04 for short)
   Polyethylene glycol (molecular weight=10,000, PC-10 for short)
   Polyethylene glycol (molecular weight=20,000, PC-20 for short)
   Polyethylene glycol (molecular weight =150,000, PC-150 for short)
   Polyethylene glycol (molecular weight =600,000, PC-600 for short)

(g) Polysaccharide:
   Curdian (CA for short)
   Sugar alcohol (from Towa Kasei Kogyo Co., Ltd.), Sorbitol PO-30, PO for short)
   Xanthan gum (XG for short)

(h) Cement dispersing agent:
   Polycarboxylate (from NMB Co., Ltd., "Rheobuild" SP-SN, SP-SN for short)
   Naphthalenesulfonic acid-formalin condensate (from NMB Co., Ltd., "Rheobuild" SP-9N, SP-9N for short)
   Mixture of salt of melaminesulfonic acid-formalin high condensate, salt of lignin-sulfonic acid, and salt of hydroxycarboxylic acid (from NMB Co., Ltd., "Rheobuild" NL-4000 and Pozzolith No. 70 in a mixing ratio of 8:1 by weight, NL-70 for short)

(i) Samples:

Table 3 shows the mixing ratio of DGME/DGME derivative, polyethylene glycol, and polysaccharide used in the Examples and the Comparative Examples.

TABLE 3

| Desig- nation of samples | Components and their mixing ratio (wt %) | | | | | |
|---|---|---|---|---|---|---|
| | DGME/DGME derivative | | Polyethylene glycol | | Polysaccharide | |
| | designation | ratio | designation | ratio | designation | ratio |
| A | BCL | 30 | PG-04 | 70 | — | — |
| B | BCL | 40 | PG-10 | 60 | — | — |
| C | BCL | 50 | PG-20 | 50 | — | — |
| D | BCL | 90 | PG-150 | 10 | — | — |
| E | BCL | 50 | PG-20 | 50 | — | — |
| F | BCL | 50 | PG-20 | 50 | — | — |
| G | BCL | 40 | PG-20 | 40 | CA | 20 |
| H | BCL | 35 | PG-20 | 35 | PO | 30 |
| I | BCL | 100 | — | — | — | — |
| J | BP1 | 100 | — | — | — | — |
| K | BP-2 | 100 | — | — | — | — |
| L | — | — | PG-04 | 100 | — | — |
| M | — | — | PG-10 | 100 | — | — |
| N | — | — | PG-20 | 100 | — | — |
| O | — | — | PG-150 | 100 | — | — |
| P | — | — | PG-600 | 100 | — | — |
| Q | — | — | — | — | CA | 100 |
| R | — | — | — | — | PO | 100 |
| S | — | — | — | — | XG | 100 |
| T | BCL | 70 | — | — | CA | 30 |
| U | BCL | 50 | — | — | PO | 50 |
| V | BP1 | 70 | — | — | CA | 30 |
| W | BP1 | 50 | — | — | PO | 50 |

(2) Method of testing mortar and concrete
(2-1) Static pressure test for mortar

The mortar samples prepared according to the mix proportion shown in Table 1 are tested for flowability which is affected by application of static pressure. The flowability is expressed in terms of the mortar flow ratio ($F_{p1}/F_0$), where $F_{p1}$ is the mortar flow which is measured after the mortar sample has undergone constant static pressure intermittently and $F_0$ is the mortar flow which is measured after the mortar sample has been allowed to stand for a prescribed period of time.

(a) Application of pressure: The procedure for application of pressure consists of placing the mortar sample in a container, on applying pressure to the sample such that the pressure reaches 50 kgf/cm$^2$ within 5 seconds, holding this pressure for 10 seconds, and relieving the pressure over a period of 5 seconds. This cycle is repeated 30 times. [* specified by "Pressure Bleeding Test Method" in 'Guide for Pump Application of Concrete (draft) proposed by The Japan Society of Civil Engineers].

(b) Mortar flow: The procedure for mortar flow test consists of packing the mortar sample into a flow cone, pulling up the flow cone, and measuring the extent to which the mortar sample spreads. ( specified by "Method for Physical Test of Cement" in JIS R-5201)

(2-2) Pumping test of mortar

The mortar samples prepared according to the mix proportion shown in Table 1 are tested for flowability which is affected by pumping. The flowability is expressed in terms of the mortar flow ratio ($F_{p2}/F_0$), where $F_{p2}$ is the mortar flow which is measured after pumping (under the specified conditions of delivery and pumping time) and $F_0$ is the mortar flow which is measured after the mortar sample has been allowed to stand for the same period as pumping time.

(a) Conditions of pumping:
   Pump: Mortar pump DM15 made by Shin-Meiwa Kogyo Co., Ltd.
   Pipe: Flexible hose, 2.5 cm in dia.×5 m long.
   Delivery: 6.0 liters/min.
   Pumping time: 10 minutes
   Ambient temperature: 20° C.
(b) Mortar flow: Tested in the same manner as in (2-1), (b) mentioned above.

(2-3) Method for test of concrete pumping

The concrete samples prepared according to the mix proportion shown in Table 2 are tested for flowability which is affected by pumping. The flowability is expressed in terms of slump flow which is measured after pumping (under the specified conditions of delivery and pumping time) and also measured after the concrete sample has been allowed to stand for the same period as pumping time.

(a) Slump flow: Measured according to "Method for Test of Concrete Slump Flow (draft)" proposed by The Japan Society of Civil Engineers.
(b) Air-entraining properties: Tested according to JIS A-1128.
(c) Conditions of pumping:
   Pumping vehicle: Model PY 110-25
   Pipe: Steel pipe, 5 inch in dia., 50 m long (horizontal)
   Delivery: 30 m³/hour
   Ambient temperature: 20° C.

(3) Test Results
(3-1) Mortar

Table 4 shows the results of the test on how the mortar samples are affected by static pressure and pumping.

Comparative examples are indicated in Table 4 by parenthesized example numerals.

Samples in Examples 1 to 12 contain the cement additive of the present invention.

Samples in Comparative Examples 1 to 3 contain DGME and a cement dispersing agent.

Samples in Comparative Examples 4 to 8 contain polyethylene glycol and a cement dispersing agent.

Samples in Comparative Examples 9 to 11 contain a polysaccharide and a cement dispersing agent.

Samples in Comparative Exarhples 12 to 15 contain a DGME derivative, a polysaccharide, and a cement dispersing agent.

Samples in Comparative Examples 16 to 18 contain a cement dispersing agent only.

The cement dispersing agent is SP-8N in Examples 1 to 8 and Comparative Example 1 to 16, SP-9N in Examples 9 and 11 and Comparative Example 17, and LN-70 in Examples 10 and 12 and Comparative Example 18.

It is noted from Table 4 that the cement additive of the present invention produces the following effect when it is added to mortar.

(a) Flowability affected by application of static pressure: The fact that the flow ratio in Examples 1 to 12 is greater than that in Comparative Examples 1 to 18 indicates that the mortar samples incorporated with the cement additive of the present invention decrease in flowability only a little when they undergo static pressure.
(b) Flowability affected by pumping: The fact that the flow ratio in Examples 1 to 12 is generally greater than that in Comparative Examples 1 to 18 indicates that the mortar samples incorporated with the cement additive of the present invention decrease in flowability only a little when they undergo pumping.
(c) Pumping pressure: The fact that the pumping pressure in Examples 1 to 12 is smaller than that in Comparative Examples 1 to 18 indicates that the mortar samples incorporated with the cement additive of the present invention have good pumpability.

TABLE 4

| | cement additive | | mortar flow (mm) | | | static | pumping test | |
|---|---|---|---|---|---|---|---|---|
| Example | sample | amount (as solids added) Cx % | after standing ($F_0$) | after pressing ($F_{p1}$) | after pumping ($F_{p2}$) | pressure test flow ratio ($F_{p1}/F_0$) | flow ratio ($F_{p2}/F_0$) | pumping pressure (kgf/cm²) |
| 1 | A | 0.35 | 246 | 240 | 232 | 0.98 | 0.94 | 0.93 |
| 2 | B | 0.25 | 245 | 242 | 233 | 0.99 | 0.95 | 0.90 |
| 3 | C | 0.20 | 248 | 249 | 243 | 1.00 | 0.98 | 0.85 |
| 4 | D° | 0.11 | 230 | 225 | 212 | 0.98 | 0.92 | 0.90 |
| 5 | E | 0.20 | 238 | 237 | 229 | 1.00 | 0.96 | 0.88 |
| 6 | F | 0.20 | 240 | 238 | 233 | 0.99 | 0.97 | 0.90 |
| 7 | G | 0.20 | 240 | 241 | 236 | 1.00 | 0.98 | 0.83 |
| 8 | H | 0.20 | 243 | 242 | 238 | 1.00 | 0.98 | 0.84 |
| 9 | C | 0.20 | 243 | 238 | 226 | 0.98 | 0.93 | 0.94 |
| 10 | C | 0.20 | 233 | 224 | 210 | 0.96 | 0.90 | 1.00 |
| 11 | G | 0.20 | 244 | 241 | 226 | 0.99 | 0.93 | 0.93 |
| 12 | G | 0.20 | 235 | 227 | 212 | 0.97 | 0.90 | 0.99 |
| (1) | I | 0.10 | 236 | 219 | 101 | 0.93 | 0.85 | 1.04 |
| (2) | J | 0.10 | 235 | 220 | 199 | 0.94 | 0.85 | 1.03 |
| (3) | K | 0.10 | 237 | 222 | 200 | 0.94 | 0.84 | 1.05 |
| (4) | L | 0.25 | 240 | 225 | 211 | 0.94 | 0.88 | 1.03 |
| (5) | M | 0.15 | 241 | 227 | 214 | 0.94 | 0.89 | 1.05 |
| (6) | N | 0.10 | 238 | 225 | 214 | 0.94 | 0.90 | 1.05 |
| (7) | O | 0.02 | 236 | 221 | 203 | 0.94 | 0.86 | 1.08 |
| (8) | P | 0.005 | 233 | 208 | 195 | 0.89 | 0.84 | 1.15 |
| (9) | Q | 0.025 | 239 | 222 | 206 | 0.93 | 0.86 | 1.10 |
| (10) | R | 0.10 | 238 | 224 | 205 | 0.94 | 0.86 | 1.09 |
| (11) | S | 0.005 | 240 | 225 | 203 | 0.94 | 0.85 | 1.11 |
| (12) | T | 0.125 | 241 | 224 | 210 | 0.94 | 0.87 | 1.08 |
| (13) | U | 0.20 | 240 | 226 | 208 | 0.94 | 0.87 | 1.06 |
| (14) | V | 0.125 | 237 | 223 | 204 | 0.94 | 0.86 | 1.08 |

TABLE 4-continued

| | cement additive | | mortar flow (mm) | | | static pressure test flow ratio ($F_{p1}/F_0$) | pumping test | |
|---|---|---|---|---|---|---|---|---|
| Example | sample | amount (as solids added) Cx % | after standing ($F_0$) | after pressing ($F_{p1}$) | after pumping ($F_{p2}$) | | flow ratio ($F_{p2}/F_0$) | pumping pressure (kgf/cm$^2$) |
| (15) | W | 0.20 | 224 | 224 | 205 | 0.94 | 0.86 | 1.07 |
| (16) | — | — | 234 | 217 | 189 | 0.93 | 0.81 | 1.03 |
| (17) | — | — | 239 | 221 | 191 | 0.90 | 0.80 | 1.25 |
| (18) | — | — | 229 | 206 | 164 | 0.90 | 0.72 | 1.38 |

(3-2) Concrete

Table 5 shows the results of test on how the concrete samples are affected by pumping. The samples in Examples 13 and 14 contain the cement additive of the present invention, whereas the sample in Comparative Example 19 does not. All the samples contain SP-8N as the cement dispersing agent.

It is noted from Table 5 that the cement additive of the present invention produces the following effect when it is added to concrete.

(a) Flowability affected by pumping: The samples in Examples 13 and 14 hardly decrease in slump flow after pumping, whereas the sample in Comparative Example 19 greatly decreases in slump flow after pumping.

TABLE 5

| | cement additive | | measured parameters | measurement made after | |
|---|---|---|---|---|---|
| | | | | standing | pumping |
| Example 13 | C | 0.20 | slump flow (cm) | 59.5 | 60.0 |
| | | | air content (%) | 1.6 | 1.4 |
| Example 14 | G | 0.20 | slump flow (cm) | 60.0 | 59.0 |
| | | | air content (%) | 1.5 | 1.4 |
| Comparative Example 19 | — | — | slump flow (cm) | 59.0 | 53.0 |
| | | | air content (%) | 1.5 | 1.3 |

(Note) Concrete temperature 20–21° C.

The cement additive of the present invention solves the problem of poor flowability and segregation which occurs when concrete is pumped. This leads to high-quality concrete with good flowability for smooth pumping.

We claim:

1. A cement pumpability-enhancing additive which comprises polyethylene glycol and diethylene glycol monobutyl ether and/or a derivative thereof in a weight ratio of 9:1–3:7 polyethylene glycol to diethylene glycol monobutyl ether and/or derivative thereof, and optionally a polysaccharide.

2. A cement pumpability-enhancing additive according to claim 1, wherein the diethylene glycol monobutyl ether and/or derivative thereof is a mixture of diethylene glycol monobutyl ether and an adduct of diethylene glycol monobutyl ether with 1–2 mol of propylene oxide.

3. A cement pumpability-enhancing additive according to claim 1, wherein the polyethylene glycol has a weight-average molecular weight of from 4,000–150,000.

4. A cement pumpability-enhancing additive according to claim 1, wherein the polysaccharide is selected from the group consisting of curdlan, xanthan gum, sugar alcohol and mixtures thereof.

5. A cement pumpability-enhancing additive according to claim 1, wherein the additive additionally comprises a cement dispersing agent.

6. A cement pumpability-enhancing additive according to claim 5, wherein the cement dispersing agent is selected from the group consisting of a polycarboxylic acid, an aminosulfonic acid, a napthalenesulfonic acid-formalin condensate, a melamine-sulfonic acid-formalin condensate, ligninsulfonic acid, and a hydroxycarboxylic acid, and metal salts thereof.

7. A cement pumpability-enhancing additive according to claim 6, wherein said metal salts are selected from the group consisting of alkali metal salts and alkaline earth metal salts.

8. A method for applying a cementitious composition to a substrate by pumping comprising the steps of
conveying a cementitious composition by means of a pump to a substrate, said cementitious composition comprising polyethylene glycol and diethylene glycol monobutyl ether and/or a derivative thereof in a weight ratio of 9:1–3:7 polyethylene glycol to diethylene glycol monobutyl ether and/or derivative thereof, and optionally a polysaccharide in an amount of up to 30% by weight of said polyethylene glycol and diethylene glycol monobutyl ether and/or derivative thereof said polyethylene glycol, diethylene glycol monobutyl ether and/or derivative thereof and polysaccharide being present in the cementitious composition in a combined amount of 0.1 to 5.0% by weight based on the weight of cement;
and subsequently applying said cementitious composition to the substrate.

9. A pumpable cementitious composition comprising a cementitious composition, the cementitious composition comprising polyethylene glycol and diethylene glycol monobutyl ether and/or a derivative thereof in a weight ratio of 9:1–3:7 polyethylene glycol to diethylene glycol monobutyl ether and/or a derivative thereof, and optionally a polysaccharide in an amount of up to 30% by weight of said polyethylene glycol and diethylene glycol monobutyl ether and/or derivative thereof, said polyethylene glycol, diethylene glycol monobutyl ether and/or derivative thereof and polysaccharide being present in the cementitious composition in a combined amount of 0.1 to 5.0% by weight based on the weight of cement.

* * * * *